Patented June 7, 1949

2,472,633

UNITED STATES PATENT OFFICE 2,472,633

PROCESS FOR ACYLATING AMINES

William P. Utermohlen, Jr., Kingsport, Tenn., assignor to Eastman Kodak Company, Rochester, N. Y., a corporation of New Jersey No Drawing. Application June 27, 1945, Serial No. 601,917

17 Claims. (Cl. 260—247)

This invention relates to a process for acylating amines.

It is known that aniline can be acetylated by heating it in a sealed tube with ethyl acetate (Ber. 30, 3071) and by heating aniline with phenyl acetate (Bull. soc. chim. (2) 3, 164; Ann. 136, 356.) Reid et al. described the preparation of various acyl derivatives of mono- and diethanol by refluxing the hydroxyalkyl amines with saturated carboxylic esters or by heating at 160° C. for a number of hours (Jour. Am. Chem. Soc. 59, 111 (1937). Hill and Aspinall described the preparation of monoacyl ethylenediamines by heating ethyl carboxylic esters with ethylenediamine at 100° C. in a sealed tube for 36 hours. Generally speaking all of these acylations require drastic conditions, i. e. heating to at least 100° C. for prolonged periods of time.

I have now found, however, that primary amines (containing a —NH$_2$ group) and secondary amines (containing a >NH group) can be acylated readily at much lower temperature and in shorter times and, hence, frequently without the formation of as many side-reaction products, by condensing the amine with certain unsaturated esters of which isopropenyl acetate is exemplary.

It is, accordingly, an object of my invention to provide an improved process for acylating amines with esters. Other objects will become apparent hereinafter.

In accordance with my invention, I acylate primary or secondary amines by condensing a primary or secondary amine with an unsaturated monocarboxylic ester of the following general formula:

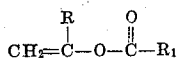

wherein R and R$_1$ each represents an alkyl group, an aralkyl group or an aryl group. When such unsaturated esters, especially isopropenyl acetate, is mixed with an aliphatic primary or secondary amine, an almost violent reaction spontaneously takes place. No catalyst is required. When aromatic amines, such as aniline or α-naphthylamine, are employed, the reaction is much slower and less vigorous, and in such cases an acid catalyst is advantageously employed.

The vigorous acetylating action of isopropenyl acetate is unique and distinguishes it from all other esters of acetic acid. Likewise, the other unsaturated esters of the above general formula are effective acylating agents, although not always as effective as isopropenyl acetate. The disclosed literature on the acylation of amines with other esters indicates the necessity of high temperatures, high pressures and lengthy reaction periods, none of which are necessary when isopropenyl acetate is employed and when many of the other unsaturated esters formulated above are employed.

With the esters which I employ in practicing my invention, the acylated amine is formed together with a ketone. With the esters which have previously been employed in acylation of amines, the acylated amine is formed together with an alcohol or a phenol. My new process proceeds according to the following chemical equation which depicts, as a specific illustration, the acetylation of isopropylamine with isopropenyl acetate:

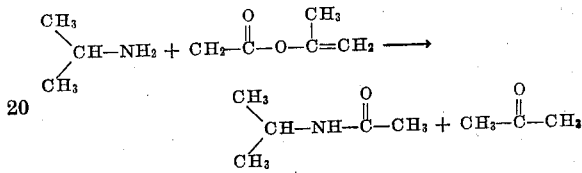

Typical of the aliphatic primary amines which can be acylated in accordance with my improved process are: methylamine, ethylamine, n-propylamine, isopropylamine, n-butylamine, sec-butylamine, isobutylamine, ter-butylamine, isoamylamine, laurylamine, β-hydroxyethylamine, β-methoxyethylamine, β-ethoxyethylamine, glycine ethyl ester, β-chloroethylamine, ethylendiamine, propylenediamine, etc. Exemplary of the aliphatic secondary amines are: dimethylamine, diethylamine, di-n-propylamine, diisopropylamine, di-n-butylamine, diisobutylamine, di-(β-hydroxyethyl)-amine, piperidine, morpholine, etc. Exemplary of the primary aromatic amines are: aniline, p-aminophenol, o-toluidine, m-toluidine, p-toluidine, o-anisidine, p-anisidine, p-chloroaniline, α-naphthylamine, β-naphthylamine, p-phenylenediamine, 1-aminoanthraquinone, 1-aminoanthracene, etc. Examplary of the secondary aromatic amines are: N-methylaniline, N-ethylaniline, N-(β-hydroxyethyl)-aniline, 1,2,3,4-tetrahydroquinoline, benzomorpholine, etc. Still other amines are 2-amino-4-methylthiazole, 2-aminobenzothiazole, etc.

Typical of the unsaturated esters which I employ in practicing my invention are: isopropenyl acetate (2-acetoxypropene-1), 2-acetoxyhexene-1, 2-acetoxyheptene-1, 2-(chloroacetoxy)-hexene-1, 2-benzoyloxyhexene-1, α-acetoxystyrene, 2-(phenylacetoxy)-propene-1, 2-acetoxy-3-phenylpropene, etc. Such unsaturated esters in which the acid radical is an acetate radical (i. e.

acetoxy derivatives) can be prepared by condensing the appropriate ketone with ketene, in the presence of sulfuric acid. See Gwynn and Degering, Jour. Am. Chem. Soc. 64, 2216 (1942). All the unsaturated esters can be prepared by adding a monocarboxylic acid (e. g. acetic acid, propionic acid, butyric acid, benzoic acid, etc.) to the appropriate monosubstituted acetylene, in the presence of boron trifluoride. See Hennion and Nieuwland, Journal of the American Chemical Society 56, 1802 (1934).

The following examples will serve to illustrate further the manner of practicing my invention.

*Example 1.—Acetanilide*

55 g. (0.55 mol.) of isopropenyl acetate, 46.5 g. (0.55 mol.) of aniline and 10 drops of sulfuric acid (sp. g. 1.84) were mixed at about 25° C. The mixture was then fractionated through an efficient still. Acetone distilled off in almost theoretical quantity, leaving a dark liquid residue which set to a mass of crystalline acetanilide upon cooling. The mass of crystals was triturated with aqueous ethyl alcohol (50 per cent by volume) to extract colored impurities. The remaining solid crystals were recrystallized from aqueous ethyl alcohol three times to give crystals melting at 111° to 114° C. These crystals gave a mixed melting point with acetanilide prepared by another method of 112° to 114° C. The yield of recrystallized acetanilide was 65 per cent.

*Example 2.—N-acetyl-α-naphthylamine*

75 g. (0.75 mol.) of isopropenyl acetate, 72 g. (0.50 mol.) of α-naphthylamine and 15 drops of sulfuric acid were mixed together at about 25° C. and allowed to stand at about 25° C. for about 16 hours. Distillation of the resulting mixture yielded only about 20 per cent of the theoretical amount of acetone. The residue which solidified upon cooling was recrystallized three times from isopropanol, yielding white fluffy crystals (which discolored somewhat on exposure to air) of N-acetyl-α-naphthylamine melting at 156° to 158° C. Yield 32 per cent.

*Example 3.—N-acetylmorpholine*

100 g. (1 mol.) of isopropenyl acetate and 10 drops of sulfuric acid (sp. g. 1.84) were mixed and placed in a flask under a reflux condenser. 87 g. (1 mol.) of morpholine were added through the condenser in portions. A violent reaction took place and the mixture soon became boiling hot as the addition of morpholine was continued. The addition of morpholine was then adjusted at such rate that the reaction mixture was kept gently boiling. The reaction mixture after the addition of all the morpholine was allowed to stand for about 16 hours. It was then fractionated at normal pressure and a nearly quantitative yield of acetone distillate was obtained. The residue was stirred with a small quantity of sodium acetate to dissipate the sulfuric acid and then fractionated in vacuo through a jacketed Vigreux column. N-acetyl-morpholine was obtained as a sharp cut boiling at 89° C. at 1 mm. of Hg pressure. The yield was over 90 per cent. The N-acetyl-morpholine was a water-white, rather viscous liquid with a faint unpleasant odor; $n_D^{20}$ 1.4337; D 20/20 1.1162. Melting point —23.5° C. Per cent nitrogen, calculated 10.85 per cent, found 10.73 per cent.

Isopropenyl acetate and morpholine also react readily without an acid catalyst to give N-acetylmorpholine.

*Example 4.—N-isobutylacetamide*

In exactly the same fashion as described in Example 3, 100 g. (1 mol.) of isopropenyl acetate, 73 g. (1 mol.) of isobutylamine and 10 drops of sulfuric acid (sp. g. 1.84) reacted to give an 80 per cent yield of N-isobutylacetamide. It was a clear light yellow liquid, faint unpleasant odor, B. P. 81° to 82° C. at 1 mm. of Hg. pressure, $n_D^{20}$ 1.4380; D 20/20 0.8975. Per cent nitrogen, calculated 12.2, found 12.6.

*Example 5.—N-(β-hydroxyethyl)-acetamide*

In exactly the same fashion as described in Example 3 except that no catalyst was employed, 105 g. of isopropenyl acetate and 63 g. of monoethanolamine (β-hydroxyethylamine) reacted to give 85.5 g. (81 per cent yield of N-(β-hydroxyethyl)-acetamide which was a yellow viscous liquid boiling at 135° to 140° C. at 0.5 to 1 mm. of Hg pressure; $n_D^{20}$ 1.4721; D 20/20 1.1165.

*Example 6.—N,N-diacetylethylenediamine and N-acetylethylenediamine*

86 g. of a 70 per cent aqueous solution of ethylenediamine was reacted in portions with 105 g. of isopropenyl acetate in the manner described above in Example 3 without an acid catalyst. The reaction mixture was distilled giving a relatively large amount of a liquid distillate B. The residue from the distillation was cooled and gave a crystalline precipitate. This small amount of solid precipitate was filtered off and designated as A. This same procedure was repeated using a larger quantity of isopropenyl acetate (210 g.) to react with the 86 g. of a 70 per cent aqueous solution of ethylenediamine and the reaction mixture was left standing for about 15 hours. From this additional reaction, a further amount of the crystalline solid A was obtained and a further amount of the liquid distillate B was obtained. The two quantities of solid A and liquid B were combined. The combined solid product A was recrystallized twice from a 50-50 (by volume) mixture of isopropanol and ethyl acetate. This treatment yielded about 30 g. of fine white needles, melting at 170° to 173° C. These fine white needles were N,N'-diacetylethylenediamine.

The combined liquid mixture B was fractionated through a heated Vigreux column in vacuo. The fractionation was rather difficult, but a fraction boiling at 122° to 124° C. at 0.5 mm. of Hg pressure was obtained. This material was a yellow vicous liquid; 28.5 g. were obtained. The residue from the fractionation weighing 76 g. solidified upon cooling and was found to be chiefly N,N'-diacetylethylenediamine.

The yellow viscous liquid obtained above by distillation was titrated for neutralization equivalent; calculated for mono N-acetylethylenediamine 102, found 116. This indicated that the mono compound was contaminated with some of the N,N'-diacetylethylenediamine. The phenylisocyanate and phenylisothiocyanate derivatives of the yellow viscous liquid obtained by distillation above were prepared and recrystallized from ethanol. The phenylisocyanate derivative melted at 189° to 192° C. The phenylisocyanate derivative melted at 171° to 173° C. These melting points agreed with the values given in the literature (Jour. Am. Chem. Soc. 61, 822) for N-acetylethylenediamine.

In the manner illustrated in the foregoing examples, other primary and secondary amines can be acylated to give acetyl, propionyl, butyryl, benzoyl, etc., derivatives.

Sulfuric acid is advantageously employed when an acid catalyst is used in practicing my invention. However, other acid catalysts can be employed, for example, hydrochloric acid, phosphoric acid, alkyl sulfuric acids, such as methyl sulfuric acid, aryl sulfonic acids, such as benzene sulfonic acid and p-toluenesulfonic acid, pyrosulfuric acid, chlorosulfonic acid, fluorosulfonic acid, sulfamic acid, N-acetylsulfamic acid, hydrobromic acid, oleum, etc.

What I claim as my invention and desire to be secured by Letters Patent of the United States is:

1. A process for acylating an amine selected from the group consisting of primary and secondary amines comprising condensing the amine with an unsaturated ester of the following general formula:

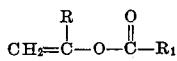

wherein R represents a member selected from the group consisting of alkyl, aralkyl and aryl groups when $R_1$ represents an alkyl group and R represents an alkyl group when $R_1$ represents a member selected from the group consisting of aralkyl and aryl groups, and recovering the acylated amine.

2. A process for acylating an amine selected from the group consisting of primary and secondary amines comprising condensing the amine with an unsaturated ester of the following general formula:

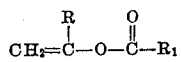

wherein R represents a member selected from the group consisting of alkyl, aralkyl and aryl groups when $R_1$ represents an alkyl group and R represents an alkyl group when $R_1$ represents a member selected from the group consisting of aralkyl and aryl groups, in the presence of an acid catalyst, and recovering the acylated amine.

3. A process for acylating an amine selected from the group consisting of primary and secondary amines comprising condensing the amine with an unsaturated ester of the following general formula:

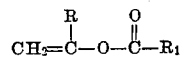

wherein R represents a member selected from the group consisting of alkyl, aralkyl and aryl groups when $R_1$ represents an alkyl group and R represents an alkyl group when $R_1$ represents a member selected from the group consisting of aralkyl and aryl groups, in the presence of a sulfuric acid catalyst, and recovering the acylated amine.

4. A process for acetylating a primary aliphatic amine comprising condensing the primary aliphatic amine with isopropenyl acetate, and recovering the acetylated amine.

5. A process for acetylating a secondary aliphatic amine comprising condensing the secondary aliphatic amine with isopropenyl acetate, and recovering the acetylated amine.

6. A process for acetylating a primary aromatic amine comprising condensing the primary aromatic amine with isopropenyl acetate, in the presence of an acid catalyst, and recovering the acetylated amine.

7. A process for acetylating an amine selected from the group consisting of primary and secondary amines comprising condensing the amine with isopropenyl acetate, and recovering the acetylated amine.

8. A process for acetylating an amine selected from the group consisting of primary and secondary amines comprising condensing the amine with isopropenyl acetate, in the presence of an acid catalyst, and recovering the acetylated amine.

9. A process for acetylating an amine selected from the group consisting of primary and secondary amines comprising condensing the amine with isopropenyl acetate, in the presence of a sulfuric acid catalyst, and recovering the acetylated amine.

10. A process for acetylating a primary aliphatic amine comprising condensing the primary aliphatic amine with isopropenyl acetate, in the presence of an acid catalyst, and recovering the acetylated amine.

11. A process for acetylating a primary aliphatic amine comprising condensing the primary aliphatic amine with isopropenyl acetate, in the presence of a sulfuric acid catalyst, and recovering the acetylated amine.

12. A process for acetylating a secondary aliphatic amine comprising condensing the secondary aliphatic amine with isopropenyl acetate, in the presence of an acid catalyst, and recovering the acetylated amine.

13. A process for acetylating a secondary aliphatic amine comprising condensing the secondary aliphatic amine with isopropenyl acetate, in the presence of a sulfuric acid catalyst, and recovering the acetylated amine.

14. A process for acetylating a primary aromatic amine comprising condensing the primary aromatic amine with isopropenyl acetate, in the presence of a sulfuric acid catalyst, and recovering the acetylated amine.

15. A process for preparing acetanilide comprising condensing aniline with isopropenyl acetate, in the presence of sulfuric acid, and recovering the acetanilide.

16. A process for preparing N-acetylmorpholine comprising condensing morpholine with isopropenyl acetate, in the presence of sulfuric acid, and recovering the N-acetylmorpholine.

17. A process for preparing N-($\beta$-hydroxyethyl)-acetamide comprising condensing monoethanolamine with isopropenyl acetate, and recovering the N-($\beta$-hydroxyethyl) acetamide.

WILLIAM P. UTERMOHLEN, JR.

REFERENCES CITED

The following references are of record in the file of this patent:

UNITED STATES PATENTS

| Number | Name | Date |
|---|---|---|
| 2,009,396 | Goldstein | July 20, 1935 |
| 2,115,413 | Dahlen et al. | Apr. 26, 1938 |
| 2,166,971 | Schmidt | July 25, 1939 |
| 2,383,965 | Gwynn | Sept. 4, 1945 |

OTHER REFERENCES

Zeit. der Physik und Chemie 125 (1927), page 246.